(12) United States Patent
Nalam

(10) Patent No.: US 7,958,191 B1
(45) Date of Patent: Jun. 7, 2011

(54) SYSTEM AND METHOD FOR CLIENT MANAGEMENT

(75) Inventor: Naveen Nalam, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 274 days.

(21) Appl. No.: 12/365,803

(22) Filed: Feb. 4, 2009

Related U.S. Application Data

(63) Continuation-in-part of application No. 12/163,749, filed on Jun. 27, 2008, now Pat. No. 7,752,261.

(51) Int. Cl.
*G06F 15/16* (2006.01)

(52) U.S. Cl. ........ 709/203; 709/216; 709/217; 709/220; 709/223; 709/240; 709/244; 709/246

(58) Field of Classification Search .................. 709/203, 709/216, 217, 226, 244, 220, 223, 246
See application file for complete search history.

(56) References Cited

U.S. PATENT DOCUMENTS

| | | | |
|---|---|---|---|
| 6,314,492 B1 | 11/2001 | Allen et al. | |
| 6,993,590 B1 | 1/2006 | Gauthier et al. | |
| 7,216,149 B1 | 5/2007 | Briscoe et al. | |
| 7,257,546 B2 * | 8/2007 | Ebrahimi et al. | 705/14.73 |
| 7,606,897 B2 * | 10/2009 | Izrailevsky et al. | 709/224 |
| 2003/0046159 A1 * | 3/2003 | Ebrahimi et al. | 705/14 |
| 2007/0260512 A1 | 11/2007 | Sattley et al. | |
| 2008/0004958 A1 | 1/2008 | Ralph et al. | |
| 2008/0086368 A1 * | 4/2008 | Bauman et al. | 705/14 |
| 2008/0146160 A1 * | 6/2008 | Jiang et al. | 455/67.11 |
| 2008/0270412 A1 * | 10/2008 | Udayasankar et al. | 707/10 |

* cited by examiner

*Primary Examiner* — Michael Won
(74) *Attorney, Agent, or Firm* — Fenwick & West LLP

(57) ABSTRACT

A computer-based method and system for selectively triggering client actions including: providing directions for obtaining client instructions, from a content provider to a client device, over a network, in response to a content request from the client device, providing the client instructions to the client device, receiving an initial image request at the computer-based management server from the client device wherein the initial image request is submitted by the client device upon execution of the client instructions, and composing and sending a beacon from the computer-based management system to the client device in response to the initial image request with the properties of the beacon triggering the client selection and execution of the action.

19 Claims, 3 Drawing Sheets

Content and directions for obtaining client instructions are provided to a client device from a networked content provider over a network in response to a content request from the client device (Step 300).

The directions are used to retrieve client instructions over a network from a management system and the instructions are executed at the client device, resulting in the submission of an initial image request over a network to the management system (Step 320).

A beacon is composed and sent from the management system to the client in response to the initial image request causing the configuration of digital storage at the client device for storing a digital representation of the beacon, with the properties of the beacon configured to trigger the client instructions to instruct the client to select and execute an action described in the client instructions (Step 340).

Optionally, the method continues when an additional image request is received at the management system and redirected to a third party system (Step 360).

Figure 3

SYSTEM AND METHOD FOR CLIENT MANAGEMENT

CROSS-REFERENCE TO RELATED APPLICATIONS

The present application is a Continuation-In-Part application of U.S. patent application Ser. No. 12/163,749, filed on Jun. 27, 2008, entitled "System and Method for Multibeaconing", incorporated herein by reference in its entirety.

FIELD OF INVENTION

The invention relates to methods and systems for client management from a management system and specifically for triggering client devices to select and execute actions on the client.

BACKGROUND OF INVENTION

Visitor interaction with networked resources such as web sites or networked e-mail is often tracked on behalf of the content servers by third party servers using beacons. Beacons are also known as tracking pixels or clear GIFs (Graphics Interchange Format). When a client device requests content from a content server, the content server directs the client device to submit an image request which includes a request for the beacon from a third party server. The image request may provide the third party server with client information and it can enable the third party server to receive, set or re-set client tracking identifiers such as third party cookies. In response to the image request, the third party server may also send a usually small (usually one pixel wide and one pixel high) and often transparent or inconspicuous beacon to the client device for display on an output device associated with the client device.

Third party servers may be involved in delivering a variety of services such as the collection of web metrics or the delivery of advertising. Directing image requests to third party servers may be accomplished by directing the client device to download a client script, such as a JavaScript™ script, when content is provided by a content provider. For example, the client script may include instructions to send image requests to each third party server in a list of hard coded third party servers. However, hard coded solutions do not provide desirable flexibility.

What is needed is a system and method for centrally managing and administering flexible actions from a third party server which is simple to adopt.

SUMMARY OF INVENTION

A method and system for selectively triggering actions at a client device includes providing directions for obtaining client instructions, from a content provider to a client device, over a network, in response to a content request from the client device. According to the current invention, the client instructions can be provided over the network from the management system to the client device in response to a request for client instructions from the client device, with the request for client instructions submitted by the client device based on the directions. An initial image request is received at the management system from the client device over the network wherein the initial image request is submitted by the client device upon execution of the client instructions. The management system composes and sends a beacon to the client device in response to the initial image request, causing the configuration of a storage device at the client device for storing a representation of the beacon, wherein the properties of the beacon are configured to trigger the client instructions to instruct the client device to select and execute an action described in the client instruction. Examples of properties can include, but are not limited to, the height, width, area, perimeter and/or spatial dimensions of the beacon, the storage size, color values and/or color intensity of the beacon. Examples of actions can include, but are not limited to creating a cookie value, setting a cookie value, clearing a cookie value, deleting a cookie value and/or initiating multibeaconing activity.

Optionally, additional image requests are received at the management server from the client device over the network and can be redirected to third party systems, thereby enabling the third party systems to read, set and/or re-set third party client identifiers such as, but not limited to, third party cookies.

Optionally, the management server can be configured to select third party systems for redirection based on one or more profiles, parameters, properties or categories such as, but not limited to, categorization of the client device, the content provider, the content, demographic data, inferred demographic data, profiles associated with the client device, geographic data, time, date, browsing history, purchasing history and/or data related to past redirections.

BRIEF DESCRIPTION OF DRAWINGS

FIG. 3 illustrates a method flow according to an example of the current invention.

Appendix A is an example of directions for obtaining client instructions.

Appendix B is an example of pseudocode for client instructions

DETAILED DESCRIPTION OF THE INVENTION

Figure 1:
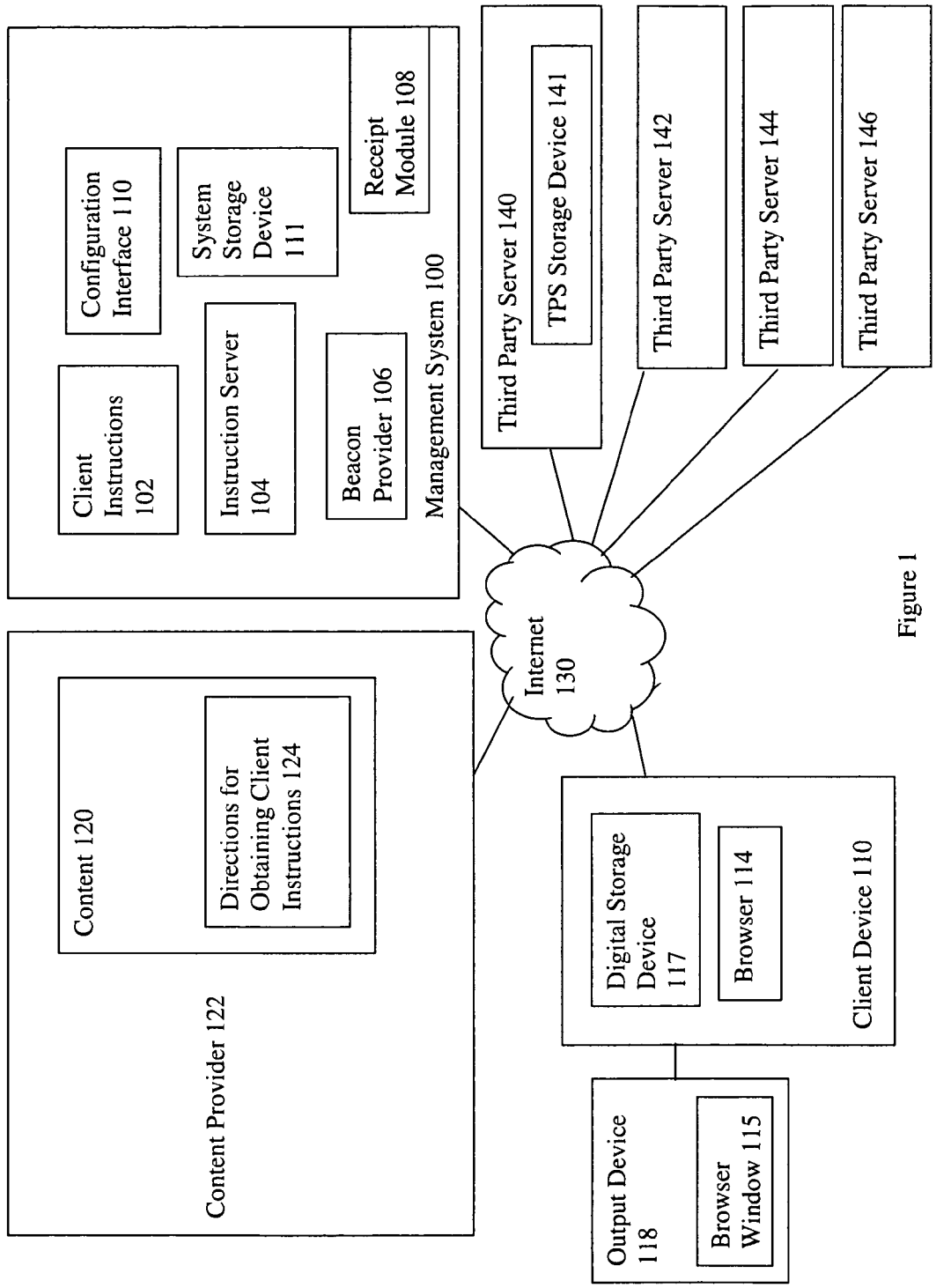
FIG. 1 illustrates a management system in an embodiment of the current invention.

FIG. 1 illustrates a management system 100 in an embodiment of the current invention. A management system 100 triggers the client device 110, such as a personal computer, to select and execute an action included in client instructions, with the action selection based on the properties of a beacon configured and sent by the management system 100. Examples of properties can include, but are not limited to, the height, width, area, perimeter and/or spatial dimensions of the beacon, the storage size, color values and/or color intensity of the beacon. Examples of actions can include, but are not limited to creating a cookie value, setting a cookie value, clearing a cookie value, deleting a cookie value, fetching additional content and/or materials such as scripts and/or Cascading Style Sheets (CSS), executing additional scripts and/or initiating multibeaconing activity. In some cases, additional content and/or materials such as scripts and/or Cascading Style Sheets (CSS) can be fetched from the management system and/or other networked resources which may or may not be controlled by the management system. When multibeaconing activity is initiated, the management system 100 can manage the redirection of additional image requests generated by the client device to targeted third party systems such as third party servers 140, 142, 144 and 146. The selection of targeted third party systems can be configured at the management system 100, enabling centralized management of third party beaconing.

Figure 2:
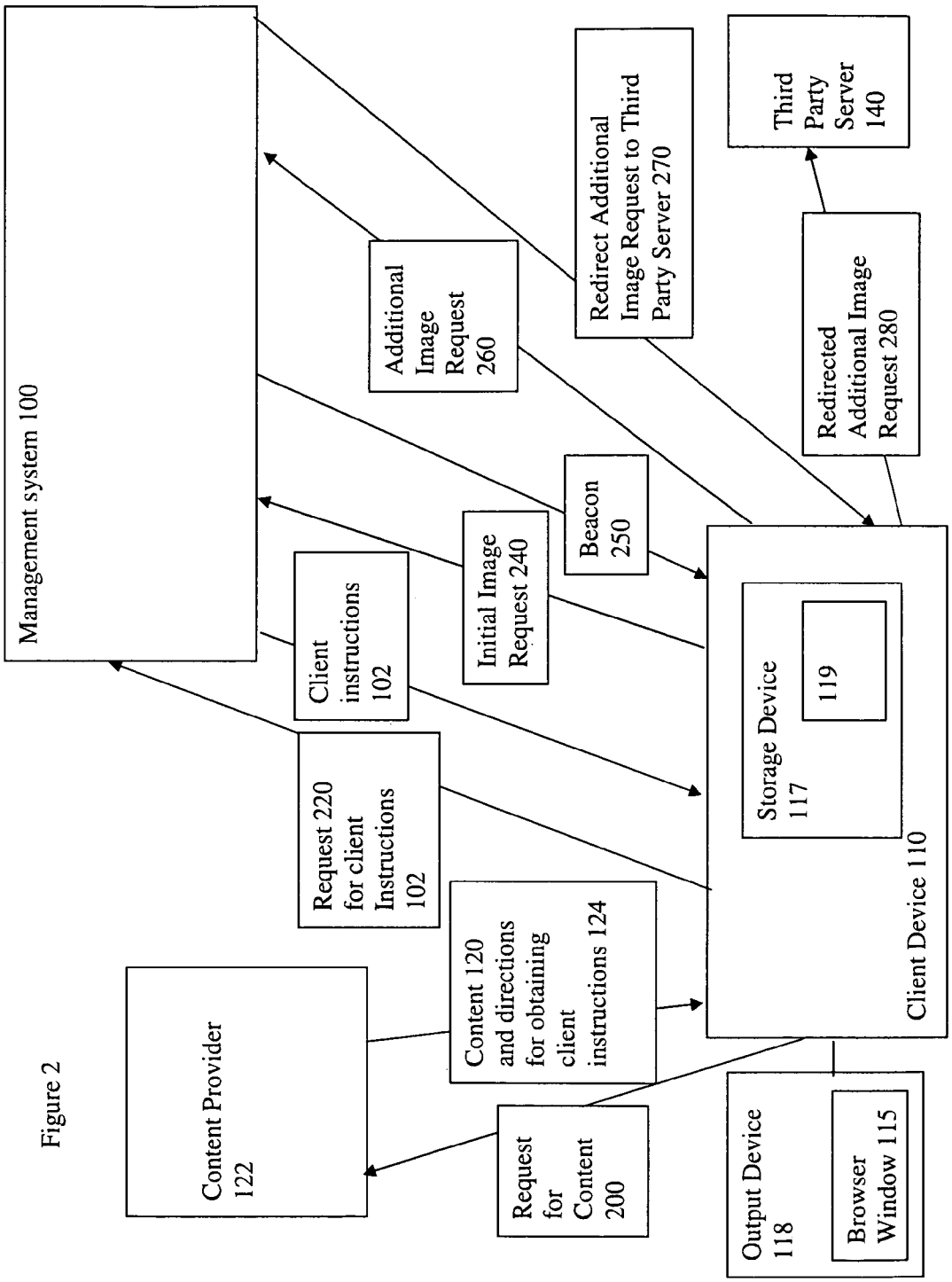
FIG. 2 illustrates an example flow of network traffic associated with an embodiment of the current invention.

FIG. 2 illustrates an example flow of network traffic associated with an embodiment 100 of the current invention. According to the current invention, a client device 110, such as a personal computer, can submit a request 200 for content 120 from a content provider 122 over a network 130, such as the Internet. The content provider 122 can provide the requested content 120 over a network 130 for presentation at an output device 118 associated with the client device 110 and include directions 124 for obtaining client instructions 102. The directions 124 can direct the client device 110 to submit a request 220 for client instructions 102 to a management system 100.

The client instructions 102 can be provided to the client device 110 over the network 130. This can enable the management system 100 to optionally read, set and/or re-set client tracking identifiers such as, but not limited to, third party cookies associated with the management system 100. Client tracking identifiers, the content 120 and/or the client instructions 102 can be stored in one or more storage devices. A storage device can be part of the client device and/or accessible by the client device over a persistent or intermittent connection such as a network.

In an embodiment of the current invention, the client instructions provided to the client device can be selected and/or configured based on one or more properties such as, but not limited to, the known, estimated or inferred properties and/or history of the client device, end-user and/or client software configuration. Examples of properties which can be used to select and/or configure the client instructions can include, but are not limited to, the estimated geographic location of the client device, the browsing history of the end-user, and/or the software version of the browser operating on the client device.

The client instructions 102 can be executed at the client device 110, resulting in the submission of an initial image request 240 to the management system 100 over a network 130. This can enable the management system 100 to optionally read, set and/or reset client tracking identifiers such as, but not limited to, third party cookies associated with the management system 100. For example, providing the opportunity to read, set and/or reset client tracking identifiers at this stage can be useful for cases when a cached copy of client instructions 102 are used.

In response to the initial image request 240, the management server composes and sends a beacon 250 to the client device 110, causing the configuration of a storage device 117, such as storage registers, at the client device 110 for storing a representation 119 of the beacon 250. Examples of storage devices include, but are not limited to, volatile memory, non-volatile memory, storage registers, Random Access Memory (RAM), flash memory, on-board memory, hard disk storage devices and combinations thereof. In this example, the beacon 250 includes a small, transparent image which can be presented as an element of a web page in a browser window 115 on an output device 118 such as a computer monitor. The beacon 250 can be small and inconspicuous on an output device such as a computer monitor. In some cases, the beacon may not be displayed by the output device or the beacon can be invisible.

According to the current invention, the beacon 250 is composed to trigger the client device to select and execute an action described in the client instructions. The beacon can be composed to select an action based on a variety of considerations. In some cases, the beacon can be composed based at least in part on one or more properties such as but not limited to, the known, estimated or inferred properties and/or history of the client device, end-user and/or client software configuration. Examples of properties which can be used when composing the beacon can include, but are not limited to, the estimated geographic location of the client device, the browsing history of the end-user, and/or the software version of the browser operating on the client device.

Client instructions 102 can further include directions for handling beacons such as beacon 250 received at the client device 110 from the management system 100. For example, in response to the receipt of the beacon 250 from the management system 100, client instructions 102 can direct the client device 110 to assess the properties of the beacon 250 and select and execute an action described in the client instructions 102 based on the properties of the beacon 250. Examples of actions can include, but are not limited to creating a cookie value, setting a cookie value, clearing a cookie value, deleting a cookie value, fetching additional scripts, fetching a Cascading Style Sheet (CSS) and/or initiating multibeaconing activity. The example provided in Appendix B can select and execute three different actions depending on the properties of the beacon (initiate multibeaconing, load another script, or delete a cookie). For example, initiating multibeaconing activity can direct the client device to submit a number of additional image requests 260 to the management system 100 over the network 130. The client instructions 102 can enable the client device 110 to determine the number of additional image requests 260 to send based in part on the properties of the beacon 250 received by the client device 110 from the management system 100. Examples of properties include, but are not limited to, the height, width, area, perimeter and/or spatial dimensions of the beacon, the storage size, color values and/or color intensity of the beacon. In response to the receipt of a beacon 250, the client device 110 can submit additional image requests 260 to the management system 100 which can be redirected to third party systems such as targeted third party servers 140, 142, 144 and 146 by the management system. In this example, the additional image request 260 is redirected to a targeted third party server 140 through the client device 110, enabling the targeted third party servers such as third party server 140 to optionally read, set and/or re-set client tracking identifiers such as, but not limited to, third party cookies on the client device 110. In this example, the number of additional image requests 260 may be configured to equal the number of third party systems targeted for redirection.

For the embodiment of the current invention depicted in FIGS. 1 and 2, the client device 110 is a personal computer running a web browser 114; the web browser 114 presents a browser window 115 on an output device 118, such as a personal computer monitor, associated with the client device 110. In this example, the content 120 and the beacon 250 are both presented on the same output device 118. However, it is understood that in other embodiments of the current invention, the output device used to present the beacon 250 may or may not be the same output device used to present the content 120. In some cases, one or more output devices can be used to present the content 120 which may or may not include the output device used to present the beacon. Examples of output devices 118 can include, but are not limited to, output devices external to the client device, output devices integrated with the client device, multimedia systems, video output devices, televisions, monitors, displays, audio output devices, speakers, headphones or any combination thereof. In some cases, the output devices can be integrated with the client device; for example, according to the current invention, the client device can be a cell phone and the integrated cell phone screen can be an output device. In some cases, the output device can be external to the client device, such as a projection screen coupled to a client device, such as a personal computer, over a persistent or intermittent connection such as a network or cable.

For the embodiment of the current invention depicted in FIGS. 1 and 2, the network 130 is the Internet. However the network 130 can be a phone network, an internet, a cable network, an intranet, a local area network (LAN), the Internet or any combination thereof. According to the current invention, a client device may be a wired or wireless device used for persistent or intermittent access to the network 130. Examples of client devices include, but are not limited to, a personal computer, a portable computer, a PDA (Personal Digital Assistant), a DVR (digital video recorder), a PVR (personal video recorder) and/or a cell phone.

In the embodiment of the current invention depicted in FIGS. 1 and 2, the management system 100 includes a computer server intermittently or persistently coupled to a network 130, such as the Internet. However, it is understood that a management system can be distributed across multiple computers, computing devices, servers, systems, locations and/or networks. Furthermore, a management system is coupled to the network 130 which can include one or more networks such as a phone network, an internet, a cable network, an intranet, a local area network (LAN), the Internet or any combination thereof.

The client device 110 depicted in FIGS. 1 and 2 uses a web browser 114 to request content 120 from the content provider 122 over the network 130. In this example, an end-user operates a personal computer running a web browser 114 to request a web page from a web site over the Internet. However, in other examples according to the current invention, other viewers or access software may operate on the client device for accessing or presenting networked resources. Furthermore, the content requested by the client device can include, but is not limited to, web pages, text, images, video content, audio content, multimedia presentations or any combination thereof, which can be presented to one or more end-users using one or more output devices and can be stored in one or more storage devices.

According to the current invention, the content provider 122 provides the requested content 120 over a network 130 and directs the client device 110 to download client instructions 102 from a management system 100. For the example illustrated in FIGS. 1 and 2, the content provider 122 is a web site which provides content 120 in the form of a web page. A content provider 122 such as a web site may direct a client device 110 such as a personal computer, to download client instructions 102 from a management system 100 by embedding an HTML instruction in the web page which includes the file location described using a URL (Universal Resource Locator). Appendix A is an example of directions 124 for obtaining client instructions 102. These directions 124 can be embedded in a web site to direct a client device 110 to download client instructions 102 from a management system 100.

It is an advantage of some examples of the current invention that the content provider can simply and easily integrate their current operations with a management system by incorporating a small snippet of code into their current content. Although there may be opportunities for a content provider to interact with and/or integrate with a management system, no other integration activities are required by the content provider in order to operate with this embodiment of the current invention.

It is understood that in some cases, the current invention can be configured to use the same set of client instructions for all client devices. However, in some examples according to the current invention, the client instructions can be customized. For example, in some cases, the client instructions can be customized to address the hardware, software and/or firmware configuration of the client device. In some examples, the client instructions can be customized based on one or more parameters such as, but not limited to, the geographical location of the client device and the hardware, software or firmware configuration of the client device. In some examples, the client instructions can be customized per content provider and/or based on the requested content.

In some cases, the requested content 120 may not be provided by the content provider 122 when requested by the client device 110. For example, in some cases, the content 120 may be retrieved from a cache or storage device on the client device 110 or from a cache system available on a local network or intranet. Similarly, the client instructions 102 may not be freshly downloaded from the management system 100. For example, in some cases, the client instructions 102 may be retrieved from a cache or storage device on the client device 110 or from a cache system available on a local network or intranet. Appendix B is an example of pseudocode for client instructions 102. Client instructions can be implemented using a variety of techniques. For example, client instructions 102 can include, but are not limited to, JavaScript™, HTML instructions, ActionScript™ scripts or any combination thereof.

The client instructions 102 can provide the client device 110 with information enabling the client device 110 to select and execute one or more actions described in the client instructions. The properties of the beacon 250 can be configured in a manner that is consistent with the client instructions 102. For operation of the current invention, it is important to keep the logic embedded in the client instructions 102 consistent with the rules that the management system 100 uses to configure the beacon 250. For example, if the logic embedded in the client instructions 102 directs the client device 110 to submit one additional image request 260 per pixel width of the beacon 250, then the management system 100 can construct a beacon 250 using a rule that directs it to create a beacon 250 with a pixel width equal to the desired number of additional image requests 260.

In an embodiment according to the current invention, the client instructions for triggering the client device to select and execute an action can be configured on a per management system basis. However, a variety of other possibilities are envisioned. For example, in some embodiments of the current invention, the client instructions for triggering the client device to select and execute an action can be configured per end-user, per client device, per group of client devices, per content provider and/or per requested content. In some embodiments of the current invention, the client instructions can be customized based on known, estimated and/or inferred properties and/or history associated with the end-user, client configuration and/or client device.

In an embodiment of the current invention, when triggering multibeaconing activities, the management system 100 can construct a beacon 250 with properties based on the targeted number of additional image requests 260. In an embodiment of the current invention, the targeted number of additional image requests 260 can be configured on a per management system 100 basis, with the targeted number of additional image requests 260 set to be the same for all client device interactions; a single list of third party systems can be maintained per management system. The management system can track the redirection of additional image requests to ensure that each additional image request received from a particular client device is redirected to a different third party system on the list.

According to various embodiments of the current invention, the targeted number of additional image requests and/or the list of third party systems can be configured per client device or per group of client devices. For example, an optional configuration interface 110 can be used to configure the management system 100. In some cases, the targeted number of additional image requests, the selection of the list of third party systems and/or the prioritization of the third party systems on the list can be determined when an initial image request is received by selecting the targeted number of additional image requests, the list of third party servers and/or the prioritization of the third party systems on the list based on the identity of the end-user, client configuration, client device or the categorization or grouping of the end-user, client configuration or client device. In other examples according to the current invention, the targeted number of additional image requests, the list of third party systems and/or the prioritization of the third party systems on the list can be configured per client tracking identifier value or per set of client tracking identifier values.

According to various embodiments of the current invention the targeted number of additional image requests, the list of third party systems and/or the prioritization of the third party systems on the list can be based on one or more redirection parameters such as, but not limited to, the properties and/or characteristics of the client device, client configuration and/or end-user, the actual or inferred browsing history associated with the client device, client configuration or end-user, the actual or inferred purchasing history associated with the client device, client configuration or end-user, the actual or inferred history of activity or transactions associated with the client device, client configuration or end-user, actual or inferred demographic data, the time of day, the date, the properties of the initial image request, the identity of the content provider, the values of client tracking identifiers, the service level associated with the original content provider, the geographic location of the client device or end-user, or any combination thereof. For example, a configuration interface can be used to establish configurations based on known, estimated or inferred redirection parameter values or ranges. For example, one redirection configuration may be used to select a list of third party servers for redirection based on identifying client devices associated with male end-users between the ages of 18 and 35 in the city of San Francisco between the hours of 8-10 PM who have previously visited a particular set of websites.

According to some embodiments of the current invention, the selection of targeted third party servers and/or the prioritization of the targeted third party servers can be managed on the management system 100. For example lists or databases can be maintained on the management server and used to select targeted third party servers for redirection. However, in some cases, the targeted third party servers can be provided by an external system, accessible by the management system. For example, in some cases, an external system may maintain a database of third party systems and queries may be submitted to internal and/or external databases to retrieve a complete or partial list of third party systems. In some cases, the complete or partial lists can be prioritized.

According to the current invention, the client device 110 can submit the additional image requests to the management system 100, which are redirected to third party systems such as targeted third party servers 140, 142, 144 and 146. For example, in some cases, the redirection may be accomplished by ending an HTTP command such as a temporary redirect (HTTP 302) to the client device 110. This can be used to direct the client device 110 to submit a new image request to a third party system such as targeted third party servers 140, 142, 144 or 146 thereby enabling the third party server to optionally read, set and/or re-set client tracking identifiers such as, but not limited to, third party cookies on the client device 110.

According to the current invention, the client device 110 can submit the additional image requests to the management system 100, which are redirected to third party systems, in sequence or in parallel. For example, in some cases, the client instructions 102 running on the client device can include control structures which may issue the additional image requests one at a time, waiting for a timer to expire or waiting for a response to each additional image request before submitting the next one. In other cases, the additional image requests may be submitted in parallel or in rapid succession, without waiting for responses.

In an embodiment of the current invention, management system 100 can include modules such as an instruction server 104, a beacon provider 106, an optional receipt module 108, and an optional configuration interface 110. For example, a module such as the instruction server 104 can provide client instructions 102 to a client device 110 over a network 130 in response to a request 220 for client instructions 102. In some cases, the instruction server 104 can access information and/or the client instructions 102 from a system internal or external to the current invention. In some cases, the instruction server 104 can generate or customize client instructions 102 based on the configuration of the management system 100. For various embodiments of the current invention, the client instructions 102 can be customized or generated based on other information such as, but not limited to, the information related to the client device 110 or information related to the content provider 122, or any combination thereof.

A module such as a beacon provider 106 can provide a beacon 250 to a client device 110 in response to an initial image request 240. In some cases, the beacon provider 106 can construct, customize or access a beacon 250 and send it to a client device 110 over a network 130 in response to an initial image request 240, causing the configuration of storage device 117 at the client device 110 for storing a digital representation 119 of the beacon 250. In some cases, the output device 118 associated with the client device 110 can present the beacon 250. The beacon 250 should be constructed or customized so that it is consistent with the client instructions 102 served by the management system.

A module such as receipt module 108 can receive an additional image request 260 over a network 130. In some cases, the receipt module can redirect the additional image request 260 to a third party server 140. In some cases, the receipt module 108 can access internal and/or external databases or systems to identify and/or prioritize the appropriate third party server to use as a target for the redirection. In some cases, a module such as a receipt module 108 can keep track of redirection history per client and use this, in part, to identify and/or prioritize the appropriate third party server to use as a target for the redirection.

FIG. 3 illustrates a method flow according to an example of the current invention. An example method begins when content and directions for obtaining client instructions are provided to a client device from a networked content publisher over a network in response to a content request from the client device (Step 300). The method continues when the directions are used to retrieve client instructions over a network from a management system and the instructions are executed at the client device, resulting in the submission of an initial image request over a network to the management system (Step 320). The method continues when a beacon is composed and sent from the management system to the client device in response to the initial image request causing the configuration of a storage device at the client device for storing a representation of the beacon, with the properties of the beacon configured to trigger the client instructions to instruct the client device to select and execute an action described in the client instructions (Step 340). Optionally, the method continues when an additional image request is received at the management system and redirected to a third party system (Step 360).

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

APPENDIX A

```
<!-- Start Quantcast tag -->
<script type=
"text/javascript" src="//secure.quantserve.com/quant.js"></script>
<script type="text/javascript">
_qacct="p-9fYuixa7g_Hm2";quantserve( );</script>
<!-- End Quantcast tag -->
```

Appendix B

```
/* Start Instructions */
function del_cookie(name) {
    document.cookie = name + '=; expires=Thu, 01 Jan 1970 00:00:00 GMT;
';
}
function void_onload( ) {return;}
function initial_onload( ) {
    var width = initial_img.width;
    var height = initial_img.height;
    if (width == 2) {
    // do multibeaconing
    for (int i = 1; i <= height; i++) {
        var additional_img = new Image(1,1);
        additional_img.src =
        "http://beacon.quantserve.com/additional_pixel.gif";
        additional_img.onload = function( ) {void onload( ); }
    }
    } else if (width == 3) {
    // load another script
    document.write('<' + 'script language=
    "javascript" type="text/javascript"
src="http://secure.quantserve.com/secondary.js"' + '>'
    +'</' + 'script'+ '>');
    } else if (width == 4) {
    // delete a cookie
    del_cookie("id");
    }
}
var initial_img = new Image;
initial_img.src = "http://beacon.quantserve.com/initial_pixel.gif";
initial_img.onload = function( ) {initial_onload( );}
/* End Instructions */
```

What is claimed is:

1. A computer-based method for selectively triggering a client action, the computer-based method comprising the steps of:

receiving an initial image request at the computer-based management system server from a client device over a network wherein the initial image request is submitted by the client device as directed by of the client instructions obtained by the client device based on instructions from a content provider;

selecting the client action for execution at the client device, by the computer-based management system;

identifying the beacon configuration for triggering the client device to select and execute the client action described in the client instruction; and, configuring the properties of the beacon to match the identified beacon configuration; and sending the beacon from the computer-based management system to the client device in response to the initial image request wherein the one or more properties of the beacon are configured to trigger the client device to select and execute the client action described in the client instructions.

2. The method of claim 1 wherein the action comprises reporting back to the management system with results related to the action.

3. The method of claim 1 wherein the action comprises one or more actions selected from the list of: clearing a cookie value, setting a cookie value or creating a new cookie.

4. The method of claim 1 wherein the action comprises initiating multibeaconing activity.

5. The method of claim 1 wherein the action comprises executing a script.

6. The method of claim 1 wherein the action comprises requesting additional content.

7. The method of claim 6 wherein the additional content comprises one or more elements selected from the list of a script or a Cascading Style Sheet (CSS).

8. The method of claim 1 wherein the step of providing the client instructions comprises selecting the instructions based at least in part on the properties of the client device.

9. The method of claim 1 wherein the step of providing the client instructions comprises selecting the instructions based at least in part on the properties of the end-user.

10. The method of claim 1 wherein the properties of the beacon includes the storage size of the beacon.

11. The method of claim 1 wherein the properties of the beacon includes a spatial dimension of the beacon.

12. A computer-based client management system comprising:

an instruction server for providing client instructions to a client device over a network in response to a request for client instructions from the client device, with the client instructions comprising instructions to the client device to send an initial image request to the computer-based client management system; and, a beacon provider for composing and sending a beacon from the management system to the client device in response to the initial image request from the client device, wherein the properties of the beacon are configured to trigger the client device to select and execute an action described in the client instructions, wherein composing and sending the beacon includes:

selecting the action for execution at the client device by the client management system;

identifying the beacon configuration for triggering the client device to select and execute the action; and, configuring the properties of the beacon to match the identified beacon configuration.

13. The system of claim 12 wherein the client management system further comprises:

a receipt module for receiving additional image requests generated by the client device.

14. The system of claim 13 wherein the receipt module redirects the additional image request to third party systems.

15. The system of claim 12 wherein the client instructions comprise the action of initiating multibeaconing activity.

16. The system of claim 12 wherein the properties of the beacon include the storage size of the beacon.

17. The system of claim 12 wherein the properties of the beacon include a spatial dimension of the beacon.

18. The system of claim 12 wherein the instruction server selects instructions to provide based at least in part on the properties of the client device.

19. The system of claim 12 wherein the instruction server selects instructions to provide based at least in part on the properties of the end-user.

* * * * *

UNITED STATES PATENT AND TRADEMARK OFFICE
CERTIFICATE OF CORRECTION

| | | |
|---|---|---|
| PATENT NO. | : 7,958,191 B1 | Page 1 of 1 |
| APPLICATION NO. | : 12/365803 | |
| DATED | : June 7, 2011 | |
| INVENTOR(S) | : Naveen Nalam | |

It is certified that error appears in the above-identified patent and that said Letters Patent is hereby corrected as shown below:

Column 10, line 4, after "as directed by", please delete "of".

Signed and Sealed this

Twenty-fifth Day of October, 2011

David J. Kappos
*Director of the United States Patent and Trademark Office*